No. 822,104. PATENTED MAY 29, 1906.
M. EHRET.
MOTOR CAR.
APPLICATION FILED DEC. 30, 1905.
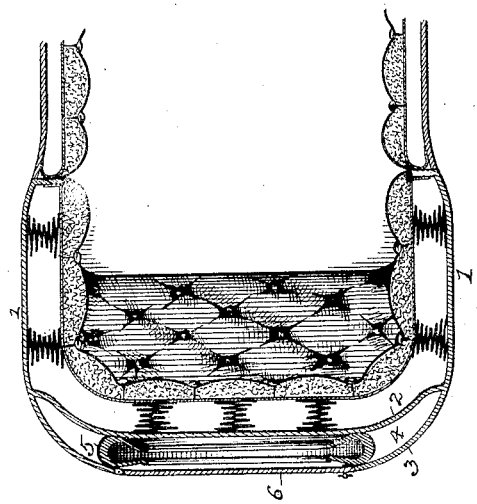
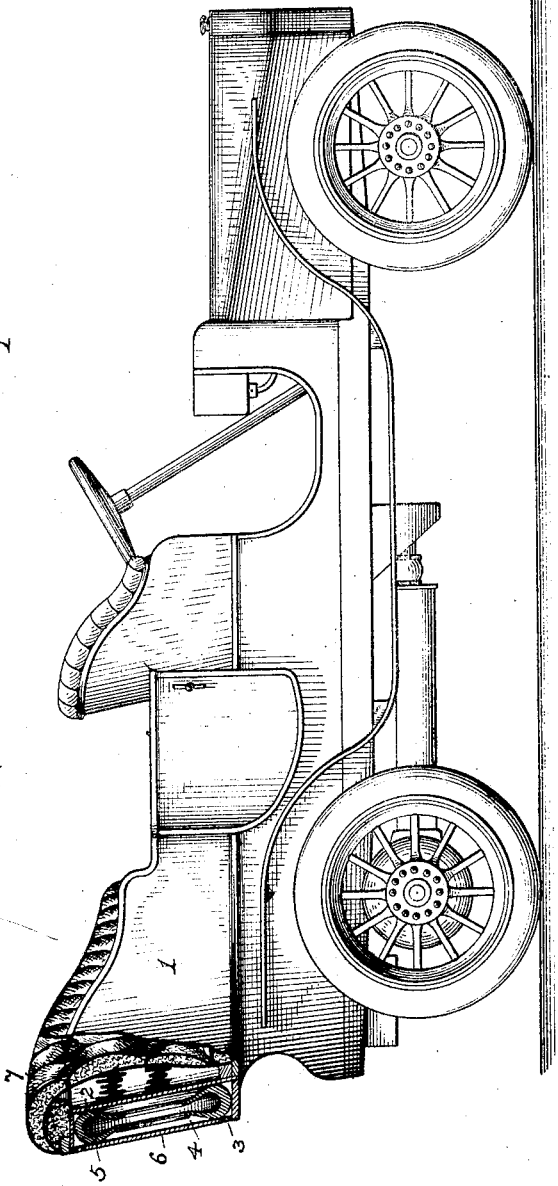
Witnesses:
Titus H. Irons
Augustus B. Coppis
Inventor,
Michael Ehret.
by his Attorneys
Howson & Howson

UNITED STATES PATENT OFFICE.

MICHAEL EHRET, OF PHILADELPHIA, PENNSYLVANIA.

MOTOR-CAR.

No. 822,104.　　Specification of Letters Patent.　　Patented May 29, 1906.

Application filed December 30, 1905. Serial No. 293,904.

*To all whom it may concern:*

Be it known that I, MICHAEL EHRET, a citizen of the United States, residing in Philadelphia, Pennsylvania, have invented certain Improvements in Motor-Cars, of which the following is a specification.

The object of my invention is to provide a convenient and unobtrusive means for storing a spare tire or tires on a motor-car.

In the accompanying drawings, Figure 1 is a side view of a motor-car, showing in section that portion of the same to which my invention particularly relates; and Fig. 2 is a sectional plan view of the rear portion of said car.

Owners and drivers of ordinary motor-cars are subject to considerable annoyance by reason of the fact that such cars lack storage capacity for a spare tire or tires, which should always be carried, and it is with the view of overcoming this objection that my invention has been devised.

The invention consists in providing the tonneau portion 1 of the car with a double back, comprising inner and outer casings 2 and 3, which provide between them a chamber 4 for receiving one or more spare tires 5. This chamber may be of any desired dimensions and accessible at any desired point, either top, bottom, side, or rear, so that the spare tire can at any time be readily withdrawn and a defective tire stored in place of same. In the present instance the storage-chamber is open at the back, this portion of the outer casing 3 being provided with a hinged door 6.

If the cushions 7 are carried over the top of the extended back of the tonneau, as shown in Fig. 1, the presence of the storage-chamber will not be suspected, nor will it detract in any manner from the proper appearance of the car even if the seat-cushions are not carried over the extended back of the tonneau, as shown. A storage-chamber such as I have provided is therefore not objectionable from an artistic standpoint, while it serves both to protect the spare tire or tires and hide the same from view, thus overcoming the objection to hanging such tire or tires in a conspicuous position on the outside of the vehicle, as is the present practice.

I claim—

1. A motor-car provided with a tonneau structure, having an extended back portion with a double casing inclosing a chamber for receiving a spare tire or tires.

2. A motor-car provided with a tonneau structure having an extended back with double casing inclosing a tire-receiving chamber, and seat-cushions extending over the top of said extended back portion of the tonneau.

In testimony whereof I have signed my name to this specification in the presence of two subscribing witnesses.

MICHAEL EHRET.

Witnesses:
　KATE A. BEADLE,
　JOS. H. KLEIN.